(12) United States Patent
Urakami

(10) Patent No.: US 7,938,216 B2
(45) Date of Patent: May 10, 2011

(54) MOVING CARRIER THAT STICKS TO SURFACE BY USE OF STICKING MEANS SUCH AS NEGATIVE PRESSURE

(76) Inventor: Fukashi Urakami, Kanagawa (JP)

( * ) Notice: Subject to any disclaimer, the term of this patent is extended or adjusted under 35 U.S.C. 154(b) by 579 days.

(21) Appl. No.: 10/528,384

(22) PCT Filed: Sep. 22, 2003

(86) PCT No.: PCT/JP03/12064
§ 371 (c)(1),
(2), (4) Date: Jan. 3, 2006

(87) PCT Pub. No.: WO2004/026668
PCT Pub. Date: Apr. 1, 2004

(65) Prior Publication Data
US 2006/0124370 A1    Jun. 15, 2006

(30) Foreign Application Priority Data

Sep. 20, 2002 (JP) .................................. 2002-276189

(51) Int. Cl.
*B60B 39/00* (2006.01)
(52) U.S. Cl. ........................ 180/164; 180/9.44; 180/9.46
(58) Field of Classification Search .................. 180/164, 180/9.44, 9.46
See application file for complete search history.

(56) References Cited

U.S. PATENT DOCUMENTS

| | | | | | |
|---|---|---|---|---|---|
| 3,810,515 A | * | 5/1974 | Ingro | ............................ | 180/54.2 |
| 3,926,277 A | * | 12/1975 | Shino et al. | .................... | 180/164 |
| 3,955,642 A | * | 5/1976 | Shino et al. | .................... | 180/164 |
| 4,095,378 A | * | 6/1978 | Urakami | ......................... | 451/88 |
| 4,809,383 A | * | 3/1989 | Urakami | ............................ | 15/98 |
| 4,926,957 A | * | 5/1990 | Urakami | ........................ | 180/164 |
| 5,007,210 A | * | 4/1991 | Urakami | ......................... | 451/92 |
| 5,536,199 A | * | 7/1996 | Urakami | ......................... | 451/91 |

FOREIGN PATENT DOCUMENTS

| | | |
|---|---|---|
| JP | 60-50088 | 4/1985 |
| JP | 7-125662 | 5/1995 |
| JP | 2804180 | 7/1998 |
| JP | 2001-58588 | 3/2001 |
| WO | 94/27856 | 5/1994 |
| WO | 01/32495 | 5/2001 |

* cited by examiner

*Primary Examiner* — Joanne Silbermann
*Assistant Examiner* — Michael R Stabley
(74) *Attorney, Agent, or Firm* — Kubotera & Associates LLC

(57) ABSTRACT

The moving carrier which sticks to the surface is provided with easy transverse movements on the surface. The moving carrier has at least two sets of driving wheels or one set of caterpillar on each of its right and the left sides relative to its traveling direction. One of the driving wheels is situated in the vicinity of the center of the sticking force; and another of the driving wheels is situated away from the center of the sticking force. The moving carrier can pivot at contact area as the pivot axis; at the contact area, one of the driving wheels situated in the vicinity of the center of the sticking force is contacted with the surface; and one of the moving units is driven and another moving units is not driven.

2 Claims, 4 Drawing Sheets

MOVING CARRIER THAT STICKS TO SURFACE BY USE OF STICKING MEANS SUCH AS NEGATIVE PRESSURE

TECHNICAL FIELD

This invention relates to a moving carrier that sticks to a surface by use of a sticking means, such as negative pressure, capable, with ease, of broadwise or transverse movements in the direction intersecting its traveling direction.

PRIOR ART

Conventionally, locomotive carriages that travel on floor or ground surfaces, such as bulldozers and tanks, have driving and moving means on both the right and the left sides relative to their travelling directions that enable free selection of either forward or reverse movements, which in turn enables such carriages to gyrate while remaining in the same position.

Additionally, there are those carriages that adhere, by use of negative pressure, for example, to and travel along wall or ceiling surfaces. One such example is an apparatus disclosed in U.S. Pat. No. 4,095,378 and in attached drawings. The apparatus comprises a decompression housing, wheels installed on the housing as traveling means, a suction-adhering seal connected to the housing with its free end caused to contact the traveling surface and a vacuum generating means used for discharging fluid contained in the decompressed area defined by the decompression housing, the suction-adhering seal and the traveling surface. When the vacuum generating means is energized, the fluid contained in the decompressed area is caused to be discharged, the fluid pressure acting on the decompression housing due to the fluid pressure difference between the exterior and the interior of the decompressed area is transmitted to the traveling surface via the wheels, and such fluid pressure causes the apparatus to adhere to the traveling surface. When the wheels are rotated by use of a driving means, such as an electric motor, during such suction-adhesion state, the apparatus will move along the traveling surface by the action of the wheels. Further, the apparatus has, installed thereon, a task-performing device, such as a sandblasting apparatus, that blasts a polishing/cleaning material onto the traveling surface.

The aforementioned locomotive carriages, such as bulldozers and tanks, and the locomotive carriage disclosed in U.S. Pat. No. 4,095,378 have the following drawbacks to be resolved: The locomotive carriages can easily move forward and backward and gyrate while remaining in the same position, but broadwise movements in the direction intersecting their traveling direction require an area in excess of twice as great as the size of each such locomotive carriage and the processes of such broadwise movements are extremely cumbersome, requiring gyration, forward movements, reverse gyration and reverse movements.

DISCLOSURE OF THE INVENTION

The purpose of the present invention is to provide a moving carrier capable, with ease, of transverse or broadwise movements in the direction intersecting its traveling direction while sticking to its traveling surface by use of a sticking means such as negative pressure.

In order to resolve the technical problem described above, the present invention aims to provide a moving carrier that sticks to the surface of an object by use of a sticking means, such as negative pressure, comprising: a moving means consisting of at least two sets of driving wheels or one set of caterpillar on each of its right and left sides relative to its traveling direction; such moving means being so constructed as to serve as a driving and moving means by way of being connected to a driving source; one contact area, randomly selected from among a number of contact areas between the driving and moving means and the traveling surface on one side randomly selected from the right and the left sides of the moving carrier relative to its traveling direction, being situated in the vicinity of the center of certain sticking force acting on the moving carrier so that the contact pressure at the area where the randomly selected contact area and the traveling surface are in contact with each other is greater than the contact pressures of the area where the other contact areas and the traveling surface are in contact with each other in order to achieve the reduction of the friction resistance at the other contact areas, and not the randomly selected contact area, and the other contact areas being situated away from the center of the sticking force; and the other contact areas being caused to slide sideways when the moving carrier gyrates with the randomly selected contact area as the pivot.

BEST MODE FOR CARRYING OUT THE INVENTION

One preferred embodiment example of the apparatus constructed according to the present invention is described below in further detail by referring to the attached Figures.

Figure 1:
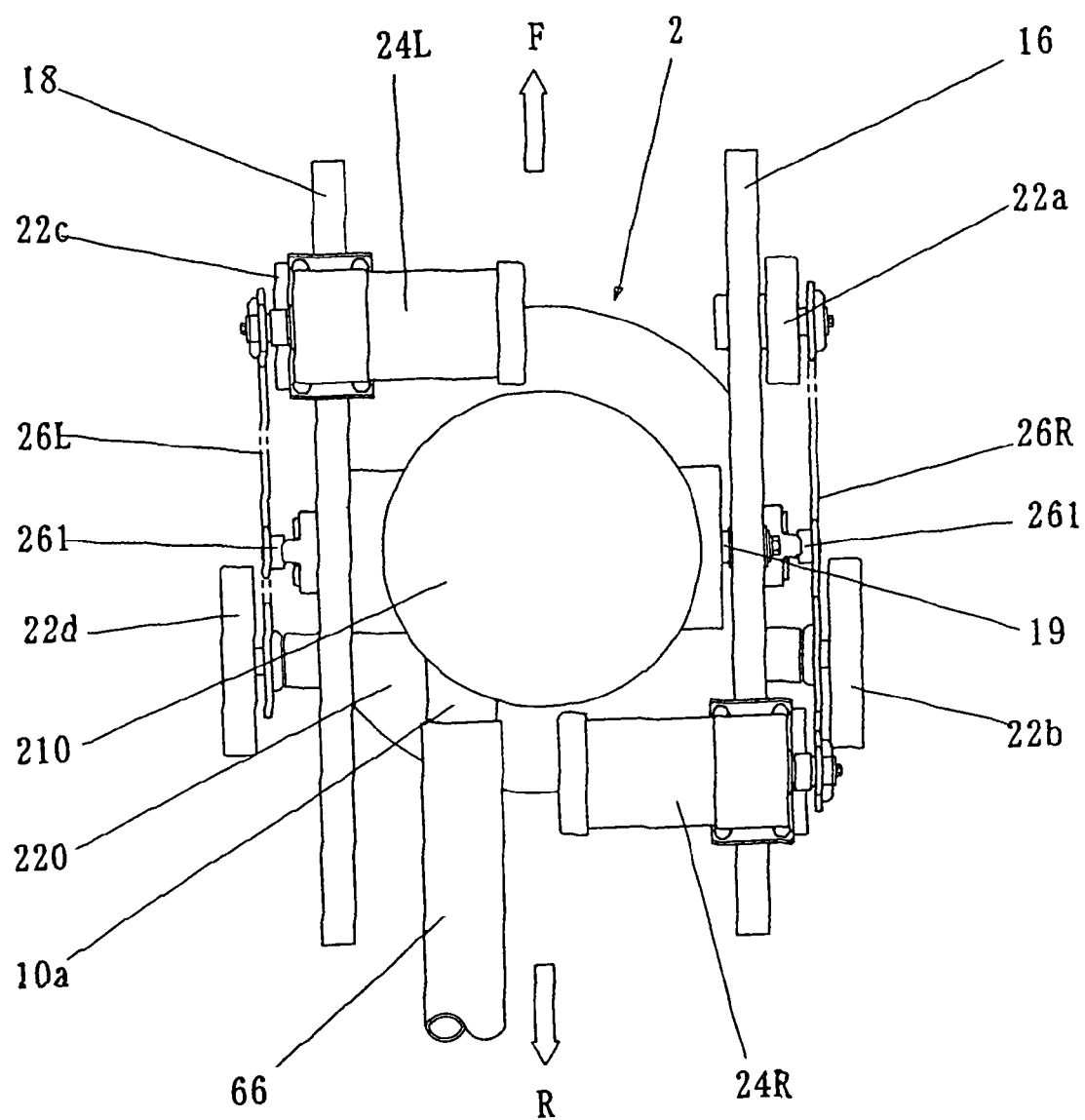
FIG. 1 shows a top view of the preferred embodiment example of the apparatus constructed according to the present invention.
Figure 2:
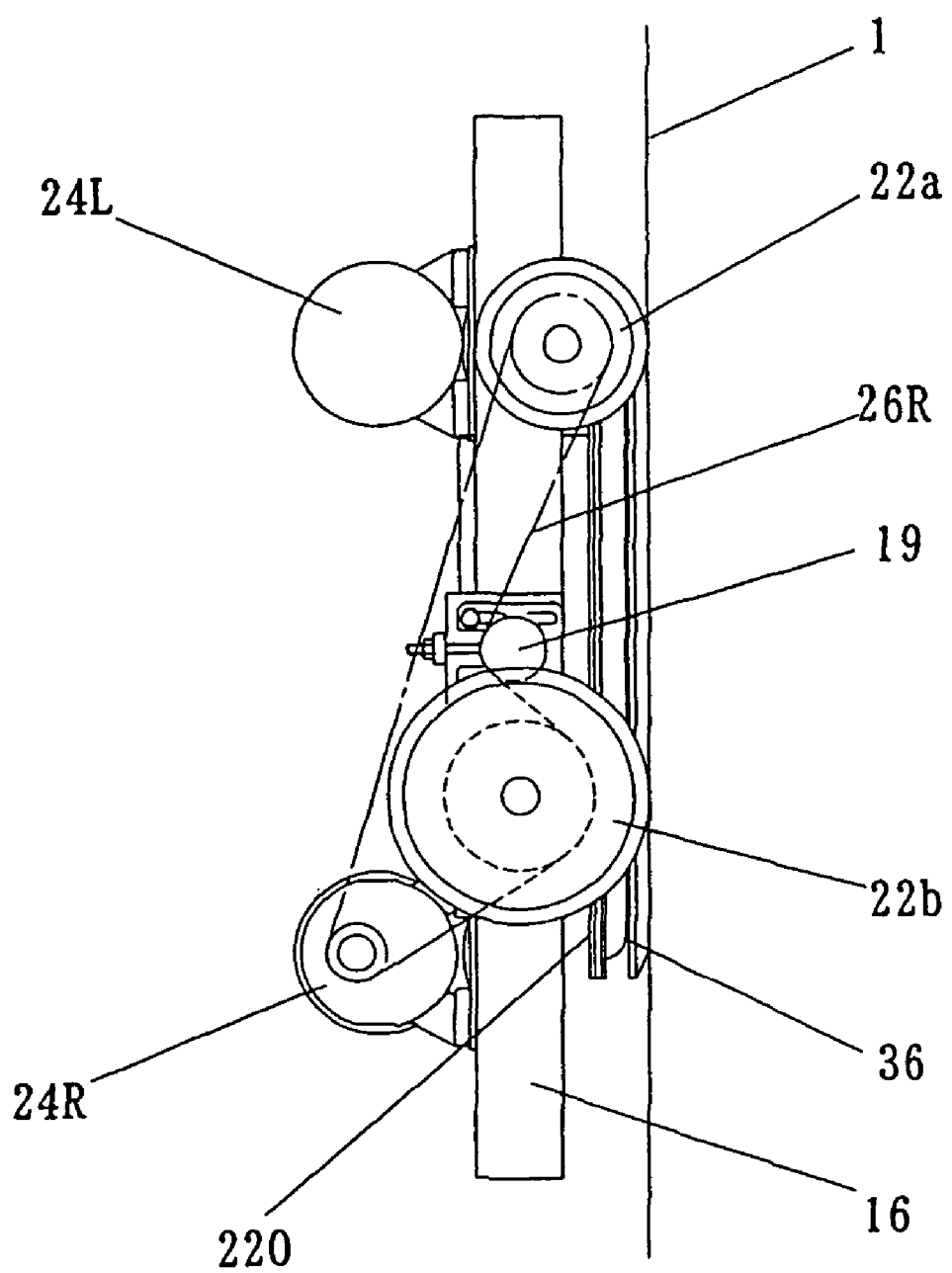
FIG. 2 shows a right side view of the apparatus shown in FIG. 1.

The moving carrier illustrated in FIG. 1 and FIG. 2 that sticks to the surface of an object by use of a sticking means, such as negative pressure, comprises a frame divided into two sections, one on the right and the other on the left of its traveling direction (shown in the arrow F), i.e., the left fixed frame 18 and the right oscillating frame 16, and a suction disk 2 situated between the fixed frame 18 and the oscillating frame 16.

The suction disk 2 comprises a cylindrical case 210 that is open at the area facing the traveling surface 1, a flat ring-shaped member 220 welded to the fringe of the open area of the cylindrical case 210, a ring-shaped suction-adhesion seal 36 made of a flexible material, such as polyurethane, installed at the periphery of the flat ring-shaped member 220, a hose coupler 10a welded to the cylindrical case 210, and a suction hose 66 whose upstream end is installed at the hose coupler 10a and downstream end is connected to a vacuum generating means (not illustrated).

The fixed frame 18 is made of long steel square bar which extends in the traveling direction and is fixed onto the left side of the cylindrical case 210. The oscillating frame 16 is made of long steel square bar which extends in the traveling direction and is supported by a hinge pin 19 welded to the right side of the cylindrical case 210, allowing the oscillating frame 16 to oscillate with the hinge pin 19 as the pivot. In other words, the relative angle between the fixed frame 18 and the oscillating frame 16 is freely changeable with the axial line of the hinge pin 19 as the center.

Mounted onto the fixed frame 18 are a driving wheel 22c, a driving wheel 22d and a geared motor 24L. Fixed onto each of the axes of rotation of the driving wheels 22c, 22d and the geared motor 24L is a sprocket. Connecting these three sprockets, installed is a roller chain 26L. Another sprocket 261 is installed for the purpose of adjusting the tension of the roller chain.

Mounted onto the oscillating frame 16 are a driving wheel 22a, a driving wheel 22b and a geared motor 24R. Fixed onto each of the axes of rotation of the driving wheels 22a, 22b and the geared motor 24R is a sprocket. Connecting these three sprockets, installed is a roller chain 26R. Another sprocket 261 is installed for the purpose of adjusting the tension of the roller chain.

The illustrated driving wheels 22a, 22b, 22c and 22d are solid tires with a wear resistant material, such as polyurethane rubber, fixed onto the peripheries.

To be noted here as crucial in the apparatus of an embodiment example of the present invention is the fact that the driving wheels 22b and 22d are situated close to the center of the suction disk 2 and that the driving wheels 22a and 22c are situated relatively away from the center of the suction disk 2. When the vacuum generating means is energized, the internal pressure of the suction disk becomes negative and the pressure of the fluid surrounding the suction disk 2 presses the suction disk 2 in the traveling direction 1. In other words, suction-adhesion force acts on the suction disk 2, with the center of such suction-adhesion force located at the center of the suction disk 2. The contact pressure at the area where the driving wheels 22b and 22d and the traveling surface 1 are in contact with each other, therefore, is greater than the contact pressure at the area where the driving wheels 22a and 22c and the traveling surface 1 are in contact with each other. In other words, the friction force at work between the driving wheels 22a and 22c and the traveling surface 1 is smaller than the friction force at work between the driving wheels 22b and 22d and the traveling surface 1. Consequently, while the driving wheels 22b and 22d have difficulty in being caused to slip and move along the traveling surface 1 by external force acting thereon, the driving wheels 22a and 22c are easily slipped and moved along the traveling surface 1 by external force acting thereon.

Another crucial point in the apparatus of an embodiment example of the present invention is the fact that, when the apparatus makes gyrating movements on a cylindrically shaped traveling surface, the driving wheels 22b and 22d will not leave such traveling surface but can constantly maintain a certain designated contact pressure against such traveling surface. To this end, it is essential that the apparatus of an embodiment example of the present invention has a fixed frame and an oscillating frame each of which is equipped with a driving and moving means comprising two sets of driving wheels or one set of caterpillar, provided however, that the apparatus of an embodiment example of the present invention need not have such fixed frame and such oscillating frame when making gyrating movements only on a flat traveling surface because the driving wheels 22b and 22d will never leave such traveling surface.

The action and the effect of the apparatus described above are explained below.

In FIG. 1, when the geared motors 24L and 24R of the moving carrier that sticks to the surface of an object by use of a sticking means, such as negative pressure, are started to rotate the driving wheels 22c and 22d and the driving wheels 22a and 22b in the same direction, the moving carrier will travel straight on the travelling surface 1 (moving forward as shown with the arrow F or moving in a reverse direction as shown with the arrow R), and when the driving wheels 22c and 22d and the driving wheels 22a and 22b are rotated in the opposite direction from each other, the moving carrier will swing (clockwise or counterclockwise) around its central axial line, facing the desired direction as a result.

Figure 3:
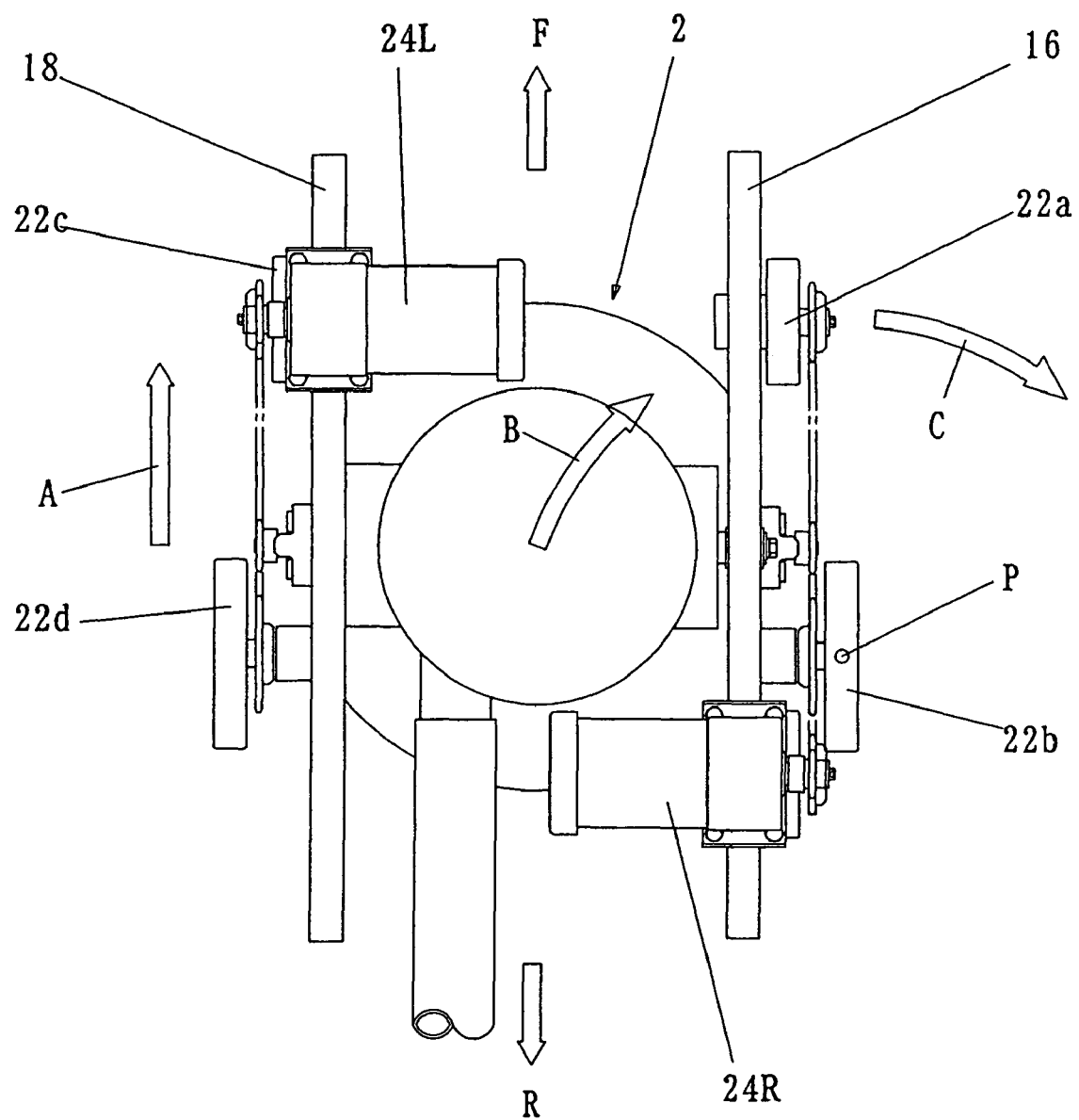
FIG. 3 shows a top view of the apparatus illustrated in FIG. 1 and FIG. 2, showing one example of its gyrating motion.

FIG. 3 is an illustration showing one example of the swinging motion of the moving carrier that sticks to the surface of an object by use of a sticking means, such as negative pressure, of the present invention. In FIG. 3, when the driving wheels 22c and 22d are rotated so as to cause the driving and moving means on the left side to move in the direction of the arrow A while the driving and moving means on the right side is maintained at a standstill, the center of the moving carrier will swing to the right in the direction of the arrow C with the contact area P between the driving wheel 22b and the traveling surface 1 as the center of gyration. At this time, the driving 22a, whose friction force at the traveling surface 1 is weaker, will slip and move in the direction of the arrow B.

Figure 4:
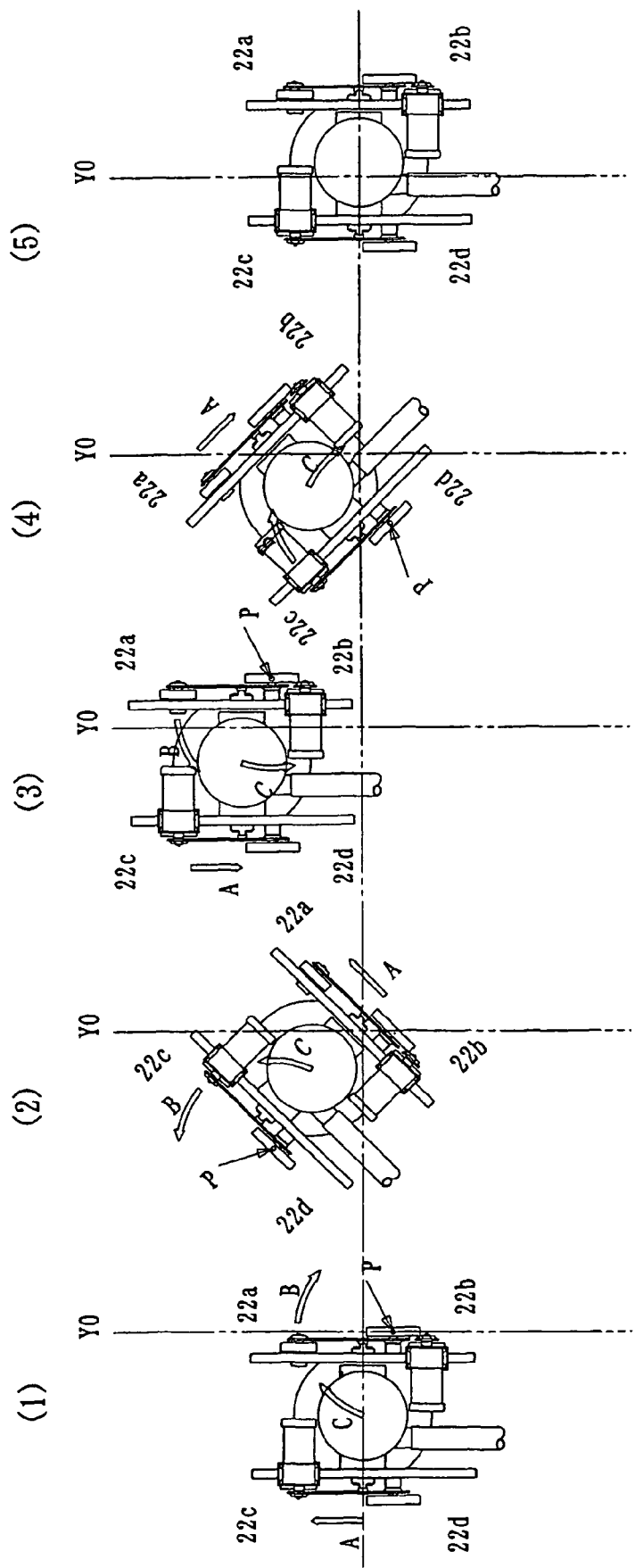
FIG. 4 is an explanatory illustration of one example of transverse movements to the right of the apparatus illustrated in FIG. 1 through FIG. 3.

FIG. 4 illustrates one example of transverse or broadwise movements to the right of the moving carrier described above. Such transverse or broadwise movements are described below.

In FIG. 4, the coordinates XO and YO are added as indicators to help understanding the transverse or broadwise movements of the moving carrier. Each of the drawings illustrated in a chronological order in FIG. 4 shows the position of the moving carrier immediately prior to the commencement of a broadwise movement at each respective time point; the arrow A shows the direction in which the driving wheels to be rotated are driven, the arrow C shows the direction in which the central portion of the moving carrier travels, the arrow B shows the direction in which the driving wheels slip and move, and P shows the pivot of the gyrating motion of the moving carrier.

The chronological moving processes of the transverse or broadwise movement to the right of the moving carrier shown in FIG. 4 are explained below.

In FIG. 4-(1), when the driving wheel 22c and the driving wheel 22d are rotated so that they move in the direction of the arrow A, the moving carrier will swing clockwise with the contact area P between the driving wheel 22b which is not rotated and the travelling surface 1 as the pivot of gyration, and will stop at the position shown in FIG. 4-(2).

In FIG. 4-(2), when the driving wheel 22a and the driving wheel 22b are rotated so that they move in the direction of the arrow A, the moving carrier will swing counterclockwise with the contact area P between the driving wheel 22d which is not rotated and the traveling surface 1 as the pivot of gyration, and will stop at the position shown in FIG. 4-(3).

In FIG. 4-(3), when the driving wheel 22c and the driving wheel 22d are rotated so that they move in the direction of the arrow A, the moving carrier will swing counterclockwise with the contact area P between the driving wheel 22b which is not rotated and the travelling surface 1 as the pivot of gyration, and will stop at the position shown in FIG. 4-(4).

In FIG. 4-(4), when the driving wheel 22a and the driving wheel 22b are rotated so that they move in the direction of the arrow A, the moving carrier will swing clockwise with the contact area P between the driving wheel 22d which is not rotated and the traveling surface 1 as the pivot of gyration, and will stop at the position shown in FIG. 4-(5).

FIG. 4-(5) shows the position of the moving carrier when a transverse or broadwise movement is completed.

Illustrated above was one example of the transverse moving processes to the right of the moving carrier illustrated in FIG. 1 through FIG. 3. No description of the transverse moving processes to the left is given here as it is easily understandable based on the above.

Described above was an embodiment example of the apparatus constructed according to the present invention. It is essential in the apparatus constructed according the present invention that one contact area randomly selected from among a number of contact areas where the driving and moving means and the traveling surface are in contact with each other on one side randomly selected from the right and the left sides of the moving carrier relative to its traveling direction and the other contact areas are so situated that the contact pressure at the area where the randomly selected contact area and the traveling surface are in contact with each other is greater than the contact pressures at the areas where the other contact areas and the traveling surface are in contact with each other in order to achieve the reduction of the friction resistance at the other contact areas, and not the randomly selected contact area. As an example of such arrangement in the apparatus of an embodiment example constructed according to the present invention, the randomly selected contact area is made to be located in the vicinity of the center of the suction-adhesion force acting on the moving carrier and the other contact areas are made to be located away from the center of the suction-adhesion force. This will increase the contact pressure at the area where the randomly selected contact area and the traveling surface is in contact with each other.

For reference sake, the present inventor proposed the following three methods of reducing the aforementioned friction resistance at other contact areas and not one contact area randomly selected from among a number of contact areas between driving and moving means and the traveling surface on one of the right or the left side relative to the traveling direction of a moving carrier also randomly selected in PCT International Disclosure No. WO 01/32495A1:

The first method of reducing the friction resistance is to maintain the driving wheel located in the randomly selected contact area at a standstill and to drive the driving wheel located in another contact area whose friction resistance is to be reduced. This will result in the racing of the latter driving wheel. This racing motion will cause the friction force at work between the driving wheel located in another contact area and the wall surface to be reduced because dynamic friction resistance is smaller than stationary friction resistance.

The second method of reducing the friction resistance is to mount a vibrating means, such as a publicly known pneumatic piston vibrator, in the vicinity of the driving wheel whose friction resistance is to be reduced. This will reduce the friction resistance at work between the driving wheel and the travelling surface whenever desired by way of the action of such vibrating means.

The third method of reducing the friction resistance is a configuration which ensures that the contact pressure at work between one randomly selected contact area and the traveling surface is greater than the contact pressure at work between other contact areas and the traveling surface. This will make the friction resistance at the other contact areas weaker than the friction resistance at the randomly selected contact area.

The purpose of the present invention is to propose a concrete method with respect to the aforementioned third method of reducing the friction resistance.

Described above was an embodiment example of the apparatus constructed according to the present invention. As described above, a moving carrier that sticks to the surface of an object by use of a sticking means, such as negative pressure, may be conveniently used as a negative pressure suction-adhesion locomotive carriage that performs various tasks on traveling surfaces, such as wall surfaces, as is disclosed in Patent 132384, capable, with ease, of transverse or broadwise movements in the direction intersecting its traveling direction. For example, it may be conveniently used as a negative pressure suction-adhesive locomotive carriage that performs the task of exfoliating old film off or of painting the surface of large structures, such as ship hulls, various storage tanks and buildings, and the task of cleaning ships' bottoms underwater, capable, with ease, of transverse or broadwise movements in the direction intersecting its traveling direction.

The preceding sections described in detail a preferred embodiment example of the apparatus constructed according to the present invention by referring to attached drawings. The present invention is not limited to such embodiment example, however. Needless to say, various shape changes and modifications may be made without departing from the scope of the present invention.

The embodiment example of the present invention described above has driving and moving means comprising two sets of driving and moving means, i.e., two sets of driving wheels installed on each of the right and the left sides of a moving carrier relative to its traveling direction. A publicly known endless track caterpillar may also be used as the driving and moving means.

Further, while the embodiment example of the present invention described above uses negative pressure as the means of suction adhesion to the surface of an object, other suction adhesion means, such as magnets, and other means that cause a moving carrier to be pressed against the surface, such as a propeller or a jet stream, may also be used. The "suction adhesion means" as used herein is defined as collective "means of sticking fast" of a moving carrier to the surface of an object.

The present invention is so constructed as described above and has the following effects:

Because the moving carrier that sticks to the surface of an object by use of a sticking means, such as negative pressure, of the present invention is capable, with ease, of broadwise or transverse movements in the direction intersecting its traveling direction, it has the advantage of requiring minimum space and minimum time for such broadwise movements.

The invention claimed is:

1. A moving carrier that sticks to a surface of an object by use of negative pressure, comprising:
   a suction housing connected to a negative pressure forming device to suck in a fluid;
   a suction opening member installed on the suction housing, a part of which is caused to contact the surface of the object, and which defines a pressure-reduced area together with the suction housing and the surface of the object;
   a member for maintaining a predetermined distance between the suction housing and the surface of the object; and
   two sets of moving units, each of the moving units including at least two sets of driving wheels;
   each of the moving units being arranged on each of its right and left sides relative to its traveling direction;
   each of the moving units being connected to a driving source;
   one of the driving wheels being situated in a vicinity of a center of a sticking force acting on the moving carrier;

another of the driving wheels being situated away from the center of the sticking force acting on the moving carrier; and a first frame fixed to the suction housing for supporting at least one of the moving units and a second frame for supporting the other of the moving units, said second frame being attached to the suction housing through a hinge pin so that the second frame can swing;

wherein the moving carrier can pivot at contact area as a pivot axis, at the contact area one of the driving wheels situated in the vicinity of the center of the sticking force being contacted with the surface, one of the moving units being driven and another moving units being not driven, and said one of the driving wheels is situated closer to the first frame or the second frame than the another of the driving wheels.

2. The moving carrier that sticks to the surface of an object by use of negative pressure, described in claim 1 above;

additionally comprising a moving process that causes the moving carrier to make transverse movements in its traveling direction;

wherein actions of the moving carrier being repeated;

each of the actions being comprised of a action that the moving carrier pivots at contact area as the pivot axis;

at the contact area, one of the driving wheels situated in the vicinity of the center of the sticking force being contacted with the surface;

wherein one of the moving units being driven and another moving unit being not driven.

* * * * *